(12) United States Patent
Cho et al.

(10) Patent No.: US 11,760,186 B2
(45) Date of Patent: Sep. 19, 2023

(54) VIBRATION DAMPING DEVICE FOR VEHICLE

(71) Applicant: DAEHEUNG RUBBER & TECHNOLOGY CO., LTD., Gimhae-si (KR)

(72) Inventors: Hee Ho Cho, Gimhae-si (KR); Jun Bok Kang, Gimhae-si (KR)

(73) Assignee: DAEHEUNG RUBBER & TECHNOLOGY CO., LTD., Gimhae-si (KR)

(*) Notice: Subject to any disclaimer, the term of this patent is extended or adjusted under 35 U.S.C. 154(b) by 204 days.

(21) Appl. No.: 17/226,027

(22) Filed: Apr. 8, 2021

(65) Prior Publication Data

US 2022/0063392 A1 Mar. 3, 2022

(30) Foreign Application Priority Data

Aug. 26, 2020 (KR) .................. 10-2020-0107880

(51) Int. Cl.
*B60K 5/12* (2006.01)
*F16F 15/08* (2006.01)

(52) U.S. Cl.
CPC ............ *B60K 5/1208* (2013.01); *F16F 15/08* (2013.01); *F16F 2224/025* (2013.01); *F16F 2228/04* (2013.01)

(58) Field of Classification Search
CPC .......... F16F 1/38; F16F 1/3835; F16F 1/3863; F16F 15/08; F16F 2224/08; F16F 2224/025; F16F 2228/04; F16F 2228/001

USPC .................................................. 267/140.13
See application file for complete search history.

(56) References Cited

U.S. PATENT DOCUMENTS

| 4,660,797 A | * | 4/1987 | Tonnies | F16F 1/387 267/141 |
| 2009/0020678 A1 | * | 1/2009 | Miyata | F16F 1/376 248/610 |
| 2019/0003552 A1 | * | 1/2019 | Iraki | F16F 1/52 |

FOREIGN PATENT DOCUMENTS

| DE | 19741462 C1 | * | 5/1999 | ............ B60K 13/04 |
| DE | 19748824 A1 | * | 5/1999 | ............ B60K 13/04 |
| DE | 10211955 A1 | * | 10/2003 | ............ F16F 1/3842 |
| EP | 2547575 B1 | | 6/2014 | |
| GB | 2156477 A | * | 10/1985 | ............... F16D 3/50 |
| KR | 10-2011-0130774 A | | 12/2011 | |
| KR | 10-1372085 B1 | | 3/2014 | |

* cited by examiner

*Primary Examiner* — Robert A. Siconolfi
*Assistant Examiner* — San M Aung
(74) *Attorney, Agent, or Firm* — Revolution IP, PLLC

(57) ABSTRACT

Proposed is a rubber bush type vibration damping device for a vehicle, which solves the problem of vibration increase which may occur in the natural frequency of the vibration damping device by changing the shapes of an inner coupling part or an outer coupling part and by using difference in the lengths of rubber insulators due to the changing of the shapes thereof. The vibration damping device includes an inner coupling part, an outer coupling part, and a plurality of rubber insulators having have different natural frequency.

2 Claims, 7 Drawing Sheets

[Fig. 1]
Prior Art
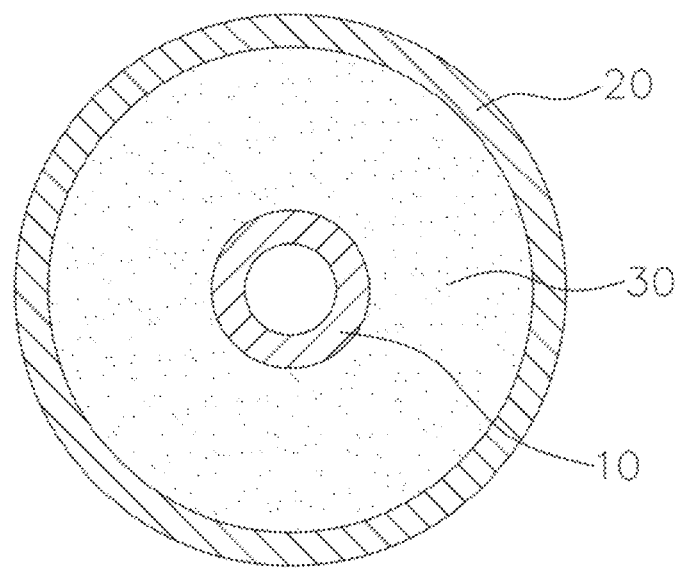

[Fig. 2]
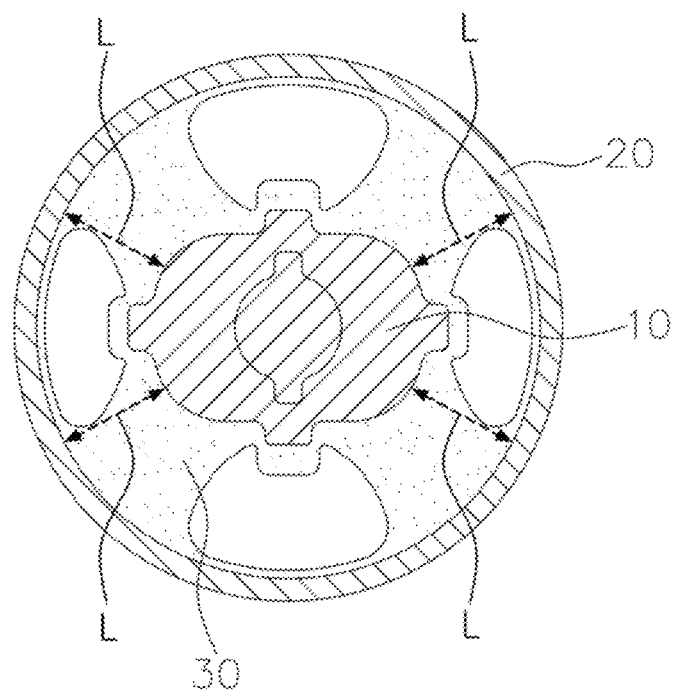

[Fig. 3]
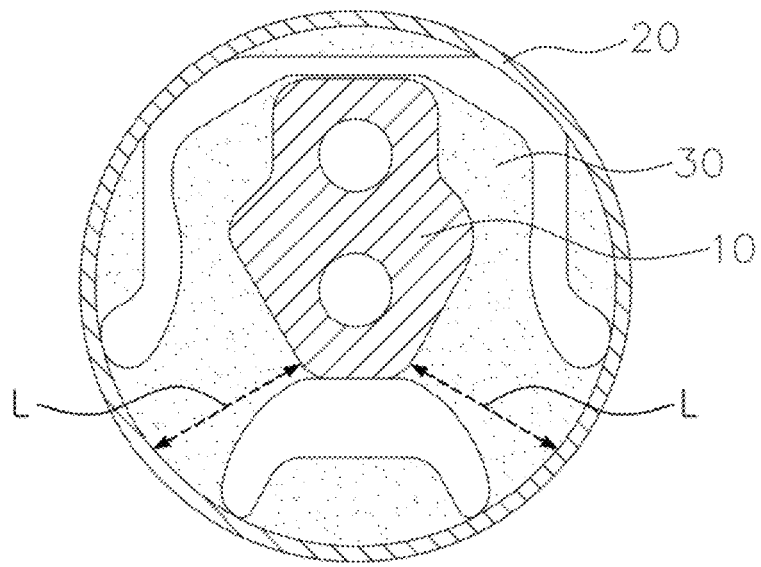
[Fig. 4]
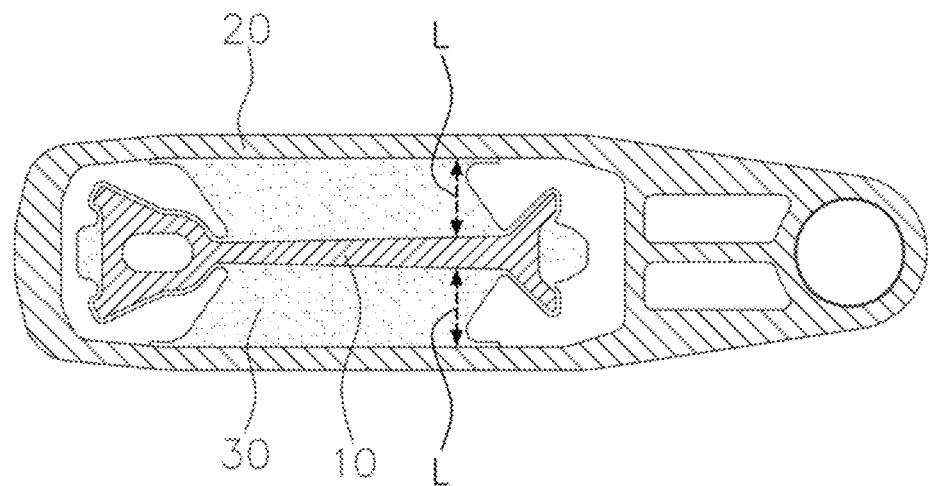

[Fig. 5]
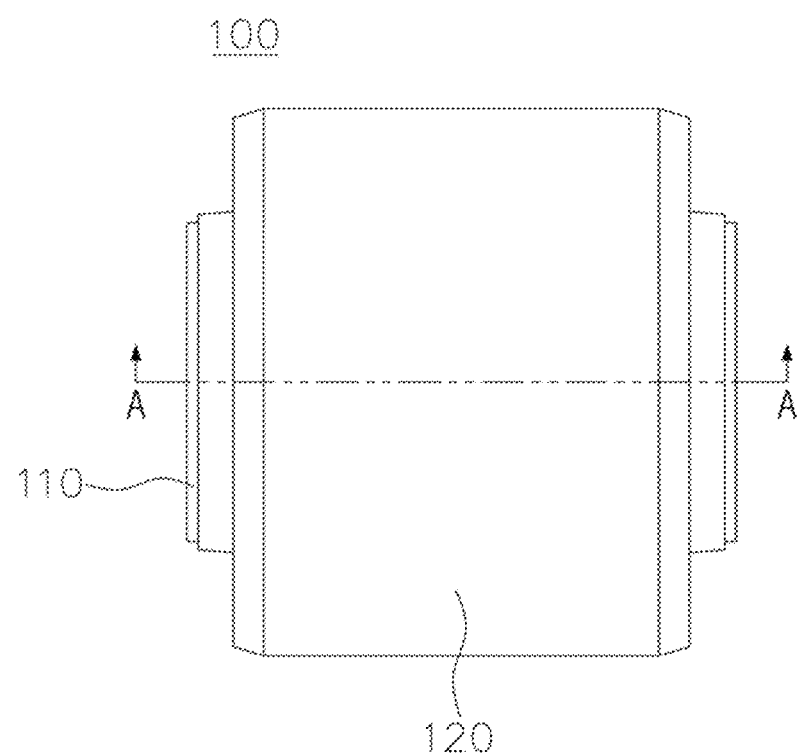

[Fig. 6]
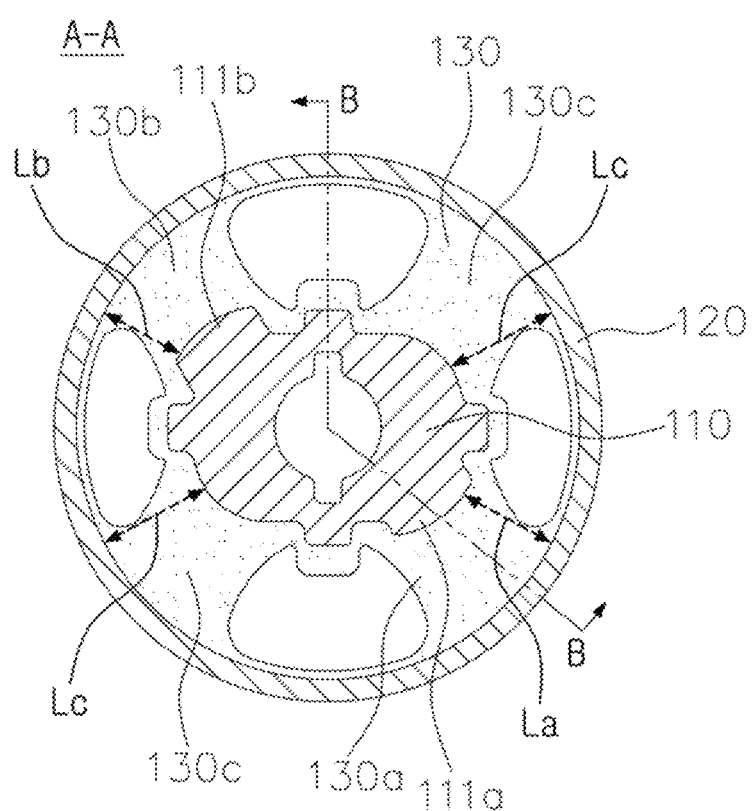

[Fig. 7]
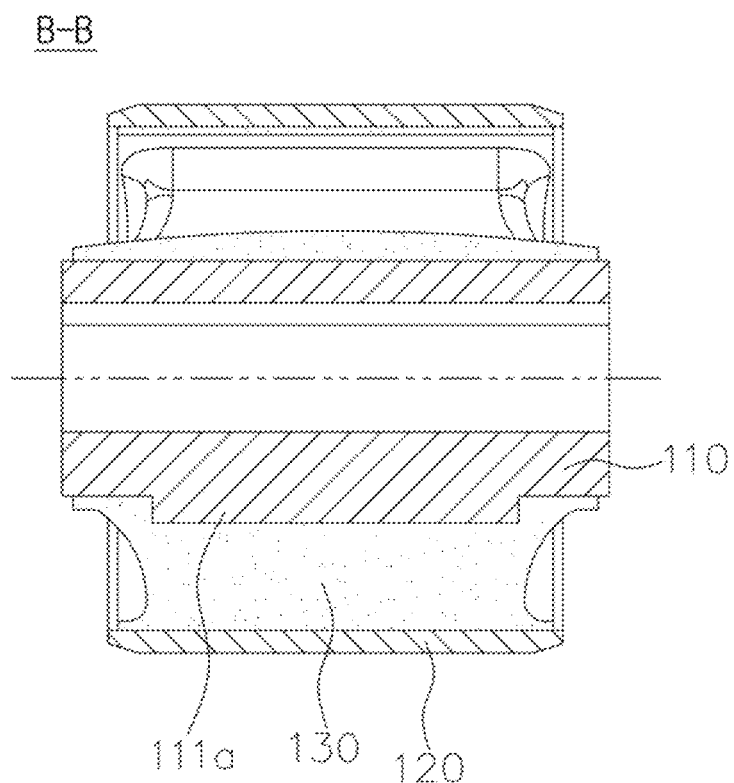
[Fig. 8]
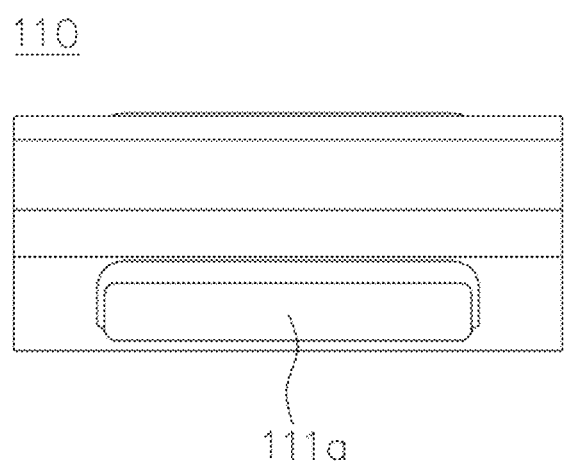

[Fig. 9]
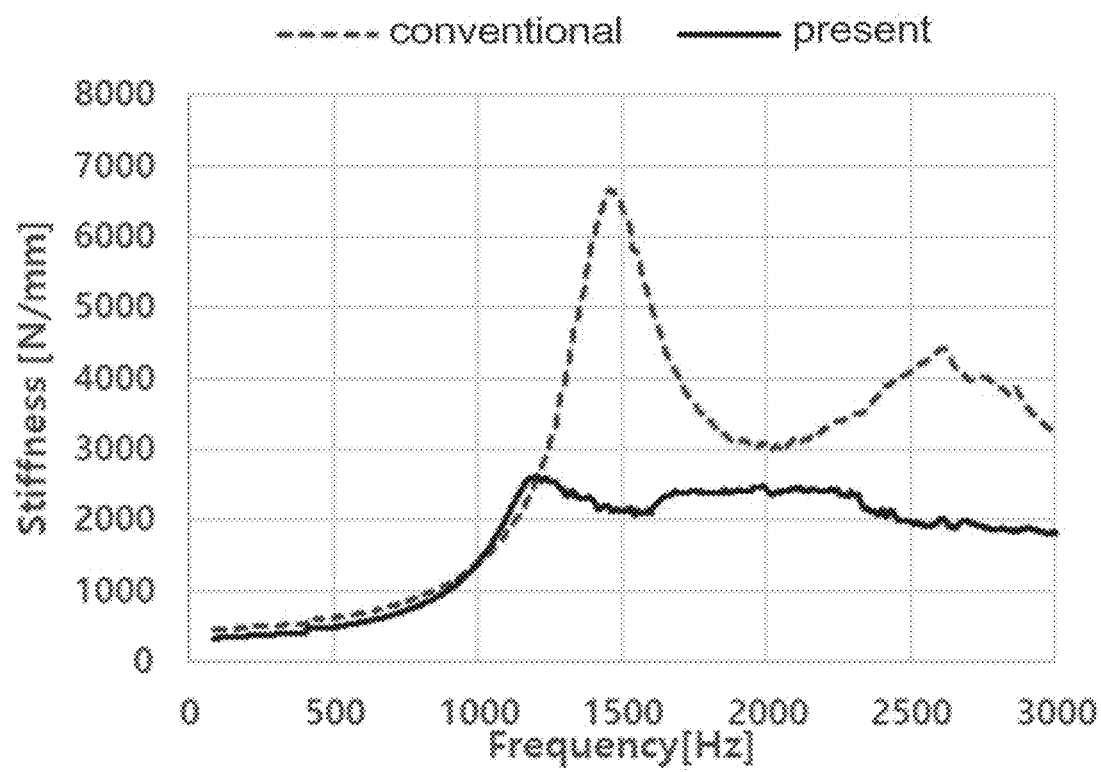

VIBRATION DAMPING DEVICE FOR VEHICLE

CROSS REFERENCE TO RELATED APPLICATION

The present application claims priority to Korean Patent Application No. 10-2020-0107880, filed Aug. 26, 2020, the entire contents of which is incorporated herein for all purposes by this reference.

BACKGROUND OF THE INVENTION

Field of the Invention

The present disclosure relates generally to a vibration damping device for a vehicle. More particularly, the present disclosure relates to a vibration damping device for a vehicle having a plurality of rubber insulators.

Description of the Related Art

During the operation of a vehicle, vibration and impact occur. Such vibration and impact include vibration generated from a power train such as an engine or transmission, vibration generated when vehicle wheels contact a road surface, and impact due to unevenness of a road.

In order to reduce such vibration and impact, a vehicle is equipped with various vibration damping devices.

The vibration damping device for a vehicle is largely divided into a rubber bushing and a hydraulic bushing.

The rubber bushing uses the vibration damping properties of a rubber insulator, while the hydraulic bushing uses the vibration damping properties of fluid sealed therein to dampen vibration or impact.

The present disclosure relates to the rubber bushing which reduces vibration especially by using the rubber insulator.

The general structure of the rubber bushing is largely divided into a whole bush-type rubber bushing and a rubber bushing.

FIG. 1 is a cross-sectional view of the whole bush-type rubber bushing.

As illustrated in the drawing, the rubber bushing of FIG. 1 is configured by including an inner coupling part 10; an outer coupling part 20 having a shape of surrounding the inner coupling part 10; and a rubber insulator 30 having an inner side bonded to the inner coupling part 10 and having an outer side bonded to the outer coupling part 20.

The rubber insulator 30 has a section structure continuing along a longitudinal direction of the rubber bushing.

The inner coupling part 10 and the outer coupling part 20 are made of metal or hard plastic, and are components to be coupled to other components of a vehicle.

The rubber insulator 30 is a vibration damping body made of rubber for reducing vibration between the inner coupling part 10 and the outer coupling part 20. In FIG. 1, the rubber insulator 30 has a shape of a whole bush which completely fills space between the inner coupling part 10 and the outer coupling part 20.

In such a conventional technology, when the input frequency of input vibration matches the natural frequency of the rubber insulator 30, the vibration is increased.

FIGS. 2 to 4 are cross-sectional views of rubber bushings having shapes different from each other.

The inner coupling parts 10 and the outer coupling parts 20 of FIGS. 2 to 4 have shapes different from each other, and may be regarded to be substantially the same as the inner coupling part 10 and the outer coupling part 20 of FIG. 1 in terms of functions thereof.

However, in FIGS. 2 to 4, unlike FIG. 1, the rubber insulators 30 have the shapes of bridges substantially separated from each other. Here, the substantial separation of the rubber insulators 30 means the separation of parts which contribute to reducing vibration.

When the shortest length L of a rubber insulator 30 is defined as the shortest length from a portion of the rubber insulator 30 bonded to the inner coupling part 10 to a portion of the rubber insulator 30 bonded to the outer coupling part 20, the shapes of a portion of the inner coupling part to which each of the rubber insulators 30 is bonded and of a portion of the outer coupling part to which each of the rubber insulators is bonded are the same or symmetrical to each other, compared to another rubber insulator 30, so the shape of each of the rubber insulators 30 is the same as or symmetrical to each other and the shortest lengths L of the rubber insulators 30 are also the same, compared to the shape of the another rubber insulator 30.

Accordingly, in the rubber bushing, each of the rubber insulators has the same natural frequency. Accordingly, when the input frequency of input vibration matches the natural frequency of each of the rubber insulators 30, the vibration is still increased.

Accordingly, during the operation of an internal combustion engine of the vehicle or a motor of the electronic vehicle, the rubber insulator 30 reduces various vibrations input continuously, but when the input frequency of input vibration matches the natural frequency of the rubber insulator 30, the vibration is increased.

Meanwhile, when a vehicle is driven, the vehicle has very low frequency vibration occurring due to contact of the vehicle with a road surface, and has very high frequency vibration occurring due to an engine or a motor thereof.

Among such vibration sources of a vehicle, a vibration source which can generate the resonance of the rubber insulator is limited to the engine or the motor with a high frequency.

That is, an engine or a motor may generate the vibration of 400 Hz to 3000 Hz, and when the frequency of the vibration matches the natural frequency of the rubber insulator which is 400 Hz to 3000 Hz, resonance occurs.

Meanwhile, except for an engine or a motor, there is no vibration source which generates the vibration of 400 Hz to 3000 Hz in a vehicle, and most vibration sources except for the engine or the motor of a vehicle only generate vibration having a low frequency of 50 Hz or less.

Accordingly, it is impossible to generate resonance in the rubber insulator having the natural frequency of 400 Hz to 3000 Hz by the low frequency of 50 Hz or less.

In addition, in the case of a conventional internal combustion engine vehicle, due to the large noise of an engine, the resonance energy of the vibration damping device has not been a problem. This is because the noise of neighboring devices could be hidden due to the large noise of the engine.

That is, in a vehicle using the conventional internal combustion engine, the resonance energy of the rubber insulator has not been recognized as a problem.

As described above, in the case of the conventional internal combustion engine vehicle, vibration caused by parts except for the engine has low frequency and does not generate resonance, and further, the resonance of the rubber insulator has not been recognized as a problem due to the large noise of the engine.

However, as a vehicle driven by a motor, such as an electronic vehicle, has recently been developed and distributed, large engine noise has disappeared (that is, a quiet environment of a vehicle has been created). Accordingly, a vibration damping device for a vehicle having a plurality of rubber insulators of the present disclosure is proposed in consideration of the fact that noise from other neighboring devices, which has not been a problem because the noise has been hidden, may emerge as a new problem to vehicle occupants.

Meanwhile, a rubber bush for suspension of a vehicle disclosed in Korean Patent No. 10-1372085 is intended to absorb vibration or impact occurring due to road surface during the driving of a vehicle, and the disclosure of European Patent No. 2547575 is intended to provide a cab suspension unit having good oscillation limitation capacities in order to be able to operate without the complement of shock absorber.

Accordingly, these conventional technologies are not related to the vibration of an engine, and are applied to vibration having the frequency of 50 Hz or less. Accordingly, the conventional technologies cannot generate resonance in the rubber insulator having the natural frequency of 400 Hz to 3000 Hz.

SUMMARY OF THE INVENTION

Accordingly, the present disclosure has been made keeping in mind the above problems occurring in the related art, and the present disclosure is intended to propose a rubber bush type vibration damping device for a vehicle, which solves the problem of vibration increase which may occur in the natural frequency of the vibration damping device by changing the shapes of an inner coupling part or an outer coupling part and by using difference in the lengths of rubber insulators due to the changing of the shapes thereof.

In order to achieve the above objective, according to one aspect of the present disclosure, there is provided a vibration damping device for a vehicle for reducing a resonance energy caused by vibration of an engine or a motor of the vehicle, the vibration damping device including: an inner coupling part; an outer coupling part having a shape of surrounding the inner coupling part; and a plurality of rubber insulators having inner sides bonded to the inner coupling part and having outer sides bonded to the outer coupling part, so that each of the rubber insulators, with a portion of the inner coupling part to which the rubber insulator is bonded and a portion of the outer coupling part to which the rubber insulator is bonded, constitutes an unit vibration damping module, wherein a shortest length of the unit vibration damping module is defined as a shortest length from a portion of the rubber insulator bonded to the inner coupling part to a portion of the rubber insulator bonded to the outer coupling part; one or more unit vibration damping modules have different shapes and different shortest lengths of the unit vibration damping module; the plurality of the rubber insulators is made of the same materials; a primary natural frequency of each of the plurality of rubber insulators is within 400 Hz to 3000 Hz; and the shortest length of the one unit vibration damping module is 70% to 98% of the shortest length of the another unit vibration damping module.

The difference between a primary natural frequency of one rubber insulator and a primary natural frequency of another rubber insulator may be within 40 Hz to 1000 Hz.

As described above, a rubber bush type vibration damping device for a vehicle according to the present disclosure solves the problem of vibration increase which may occur in the natural frequency of the vibration damping device by changing the shapes of an inner coupling part or an outer coupling part and by using difference in the lengths of rubber insulators caused by the changing of the shapes thereof such that the natural frequency of at least one rubber insulator is different from the natural frequency of another rubber insulator, thereby decreasing the entire resonance energy of the rubber insulators.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 1 is a cross-sectional view of a whole bush-type rubber bushing according to a conventional technology;

FIGS. 2 to 4 are cross-sectional views of rubber bushings according to the conventional technology;

FIG. 5 is a front view of a vibration damping device for a vehicle having a plurality of rubber insulators according to an embodiment of the present disclosure;

FIG. 6 is a cross-sectional view taken along line A-A of FIG. 5;

FIG. 7 is a sectional view taken along line B-B of FIG. 6;

FIG. 8 is a front view of an inner coupling part of FIG. 5; and

FIG. 9 is a graph illustrating difference between a resonance energy according to the embodiment of the present disclosure and a resonance energy according to the conventional technology.

DETAILED DESCRIPTION OF THE INVENTION

Hereinafter, the exemplary embodiment of the present disclosure will be described in detail with reference to the accompanying drawings so that those skilled in the art to which the present disclosure belongs can easily embody the present disclosure. However, the present disclosure may be embodied in various different forms and is not limited to the embodiment described herein. In addition, in the drawings, parts irrelevant to the description of the present disclosure are omitted in order to clearly describe the present disclosure, and similar reference numerals are assigned to similar parts throughout the specification.

Throughout the specification, when a part "includes" a certain component, it means that other components may be further included rather than excluding the other components unless specifically stated to the contrary.

FIG. 5 is a front view of a vibration damping device for a vehicle having a plurality of rubber insulators according to an embodiment of the present disclosure; FIG. 6 is a cross-sectional view taken along line A-A of FIG. 5; FIG. 7 is a sectional view taken along line B-B of FIG. 6; FIG. 8 is a front view of an inner coupling part of FIG. 5; and FIG. 9 is a graph illustrating difference between a resonance energy according to the embodiment of the present disclosure and a resonance energy according to the conventional technology.

The vibration damping device 100 for a vehicle is configured by including: the inner coupling part 110; an outer coupling part 120 having the shape of surrounding the inner coupling part 110; and each of the plurality of rubber insulators 130 having an inner side bonded to the inner coupling part 110 and having an outer side bonded to the outer coupling part 120.

The inner coupling part 110 and the outer coupling part 120 are made of metal or hard plastic, and are intended to be coupled to other components of a vehicle.

Each of the rubber insulators 130 is made of rubber for reducing vibration between the inner coupling part 110 and the outer coupling part 120.

In the vibration damping device 100 for a vehicle, rubber materials are bonded to the inner coupling part 110 and to the outer coupling part 120, and some of the rubber materials constitute the rubber insulator 130. Except for the rubber materials constituting the rubber insulator 130, remaining rubber materials are provided to increase the bonding force of the rubber insulator 130 to the inner coupling part 110 or the outer coupling part 120.

Accordingly, each of the rubber insulators 130 is made of the same material.

Each of the rubber insulators 130 and portions of the inner coupling part and the outer coupling part to which each of the rubber insulators 130 is bonded constitute a unit vibration damping module.

In the embodiment, four rubber insulators 130 separated from each other are provided, and further, four unit vibration damping modules are provided.

The primary natural frequency of each of the rubber insulators 130 is preferably within 400 Hz to 3000 Hz.

The primary natural frequency of such a rubber insulator 130 allows the rubber insulator 130 to have a basic static stiffness suitable for the rubber bushing. The vibration damping device for a vehicle having the rubber insulators 130 functions to reduce vibration in the entire range of the vehicle, and is particularly effective in attenuating resonance in the rubber insulator having the natural frequency of 400 Hz to 3000 Hz, which is a practical problem.

In the embodiment, the shortest length of the unit vibration damping module (or the shortest length of the rubber insulator) is defined as the shortest length from a portion of the rubber insulator 130 bonded to the inner coupling part 110 to a portion of the rubber insulator 130 bonded to the outer coupling part 120.

As described above, all of the conventional rubber insulators have the same shortest lengths.

In the conventional technology, a portion of the inner coupling part to which the rubber insulator is bonded and a portion of the outer coupling part to which the rubber insulator is bonded have the same shapes as or shapes symmetrical to the shapes of a portion of the inner coupling part to which another rubber insulator is bonded and of a portion of the outer coupling part to which another rubber insulator is bonded, so each of the rubber insulators has also the same shape or a shape symmetrical to each other.

Accordingly, in the conventional technology, all of the rubber insulators have the same natural frequencies, so a large resonance energy K* occurs in the rubber insulators having the same natural frequencies.

Meanwhile, the natural frequency of the rubber insulator is approximately inversely proportional to the square of the length of the rubber insulator.

Accordingly, when the length of the rubber insulator is changed, the natural frequency of the rubber insulator is changed greatly.

In consideration of this, the length of each of the rubber insulators 130 is changed such that the natural frequency of each of the rubber insulators 130 is different from each other, or the length of at least one rubber insulator 130 and the length of another rubber insulator 130 are made to be different from each other such that the natural frequency of the at least one rubber insulator 130 is different from the natural frequency of the another rubber insulator 130. In this case, the resonance frequencies (or peak frequencies) of the rubber insulators 130 having different natural frequencies become different from each other, so the resonance energy of the rubber insulators 130 may be distributed.

Accordingly, to change the length of the rubber insulator 130, the shapes of a portion of an inner coupling part or a portion of an outer coupling part of any one unit vibration damping module are not allowed to be the same as or symmetrical to the shapes of a portion of the inner coupling part and a portion of the outer coupling part of another unit vibration damping module, so the shortest length of the any one unit vibration damping module is different from the shortest length of the another unit vibration damping module.

In the present embodiment, as illustrated in FIG. 6, two protrusion parts 111*a* and 111*b* are formed on the outer surface of the inner coupling part 110 by protruding therefrom toward the rubber insulators 130 to have different heights.

Accordingly, in the embodiment, one rubber insulator 130*a* having the shortest length of La, one rubber insulator 130*b* having the shortest length of Lb, two rubber insulators 130*c* having the same lengths Lc as in the conventional technology are provided.

The shortest length of at least one unit vibration damping module is preferably 70% to 98% of the shortest length of another unit vibration damping module.

When the shortest length of the one unit vibration damping module is more than 98% and less than 102% of the shortest length of the another unit vibration damping module, the resonance energy is difficult to be divided owing to ductility of the rubber insulators, so the effect of reducing the resonance energy is insufficient.

In addition, when the shortest length of one unit vibration damping module is less than 70% of the shortest length of another unit vibration damping module, unstable damping as a whole may occur due to rapid change of the resonance energy.

Particularly, the difference between a primary natural frequency of one rubber insulator and a primary natural frequency of another rubber insulator is preferably within 40 Hz to 1000 Hz.

When the difference between the primary natural frequency of one rubber insulator and the primary natural frequency of another rubber insulator is less than 40 Hz, the resonance energy is difficult to be divided owing to ductility of the rubber insulators, so the effect of reducing the resonance energy is insufficient.

In addition, when difference between the primary natural frequency of one rubber insulator and the primary natural frequency of another rubber insulator is more than 1000 Hz, unstable damping as a whole may occur due to rapid change of the resonance energy.

In the embodiment, two rubber insulators 130 have the same shortest lengths Lc, and two other rubber insulators 130 have the shortest lengths La and Lb different from each other.

However, in some cases, all rubber insulators 130 may have the shortest lengths different from each other, or only one rubber insulator 130 may have the shortest length different from the shortest lengths of remaining rubber insulators 130.

FIG. 9 illustrates a dynamic spring constant according to the conventional technology of FIG. 2 and a dynamic spring constant according to the embodiment of the present disclosure of FIG. 6.

In the case of the conventional technology, the peak value of the dynamic spring constant is approximately 6600 N/mm in 1400 to 1500 Hz, but in the case of the embodiment of the present disclosure, the peak value of the dynamic spring constant is approximately 2000 to 2600 N/mm in 1100 Hz to 2500 Hz.

Accordingly, in the embodiment of the present disclosure, the resonance energy K* can decrease to 50% or less of the resonance energy of the conventional technology.

In the embodiment, the protrusion parts 111*a* and 111*b* are formed on the inner coupling part 110 such that the shortest lengths of the rubber insulators 130 are changed.

However, according to other embodiments, the protrusion parts may be formed inward on the outer coupling part 120, or the protrusion parts may be formed both on the inner coupling part 110 and on the outer coupling part 120.

In the embodiment, four rubber insulators 130 are provided, but the number of the rubber insulators 130 may be changed according to an embodiment.

In FIGS. 3 and 4 illustrating the conventional technology, two rubber insulators are provided, and when the shortest length of one of the rubber insulators is changed, the objective of the present disclosure can be achieved.

In FIG. 6, the protrusion parts are formed outward on the inner coupling part, and such a method may be applied even in FIGS. 3 and 4.

In addition, apart from such a method forming the protrusion parts, the shape of the inner coupling part or the shape of the outer coupling part may be changed, so the shortest lengths of the rubber insulators located therebetween may be changed.

Additionally, as illustrated in FIG. 1, even in the case of the whole bush-type rubber bushing, the rubber insulator having the shape of a whole bush may be changed to rubber insulators having bridge shapes, and the shortest lengths of the rubber insulators may be designed to be different from each other, thereby reducing the entire resonance energy of the rubber insulators.

The above description of the present disclosure is only for illustrative purposes, and those skilled in the art will appreciate that various modifications are possible without departing from the scope and spirit of the present disclosure. Therefore, it should be understood that the embodiment described above is illustrative in all respects and not limiting. For example, each component described as a single type may be implemented in a distributed manner, and similarly, components described as being distributed may also be implemented in a combined form.

The scope of the present disclosure is indicated by the claims to be described later rather than the detailed description, and it should be interpreted that all changes or modified forms derived from the meaning and scope of the claims and concept equivalent thereto are included in the scope of the present disclosure.

What is claimed is:

1. A vibration damping device for a vehicle for reducing a resonance energy caused by vibration of an engine or a motor of the vehicle, the vibration damping device comprising:
    an inner coupling part;
    an outer coupling part having a shape of surrounding the inner coupling part; and
    a plurality of rubber insulators having inner sides bonded to the inner coupling part and having outer sides bonded to the outer coupling part, so that each of the rubber insulators, with a portion of the inner coupling part to which the rubber insulator is bonded and a portion of the outer coupling part to which the rubber insulator is bonded, constitutes a plurality of unit vibration damping modules,
    wherein a shortest length of the plurality of unit vibration damping modules are defined as a shortest length from a portion of the rubber insulator bonded to the inner coupling part to a portion of the rubber insulator bonded to the outer coupling part,
    wherein the plurality of unit vibration damping modules have different shapes and different shortest lengths,
    wherein the plurality of the rubber insulators is made of the same materials,
    wherein a primary natural frequency of each of the plurality of rubber insulators is within 400 Hz to 3000 Hz and when a frequency of the vibration of the engine or the motor of the vehicle matches, the resonance energy occurs,
    wherein the shortest length of any one unit vibration damping module is 70% to 98% of the shortest length of any other unit vibration damping module.

2. The vibration damping device of claim 1, wherein the difference between a primary natural frequency of one rubber insulator and a primary natural frequency of another rubber insulator is within 40 Hz to 1000 Hz.

* * * * *